Dec. 28, 1948.  D. O. KOCH  2,457,158
VITREOUS BONDING COMPOSITIONS
Filed July 23, 1947

Daniel Oscar Koch
INVENTOR.

BY
ATTORNEY

Patented Dec. 28, 1948

2,457,158

UNITED STATES PATENT OFFICE 2,457,158

VITREOUS BONDING COMPOSITIONS

Daniel O. Koch, Rahway, N. J., assignor to E. I. du Pont de Nemours & Company, Wilmington, Del., a corporation of Delaware Application July 23, 1947, Serial No. 762,986

5 Claims. (Cl. 106—49)

This invention relates to bonding compositions which have particular utility for bonding vitrified ceramic structures to a metal, and to metal-vitrified ceramic articles in which the metal is bonded to the vitrified ceramic by said bonding compositions. More particularly, this invention relates to a new and improved bonding composition comprising a dispersion of finely divided particles of silver and a glass flux in a liquid vehicle, and to new and improved articles comprising vitrified ceramic structures, including glass and porcelain, bonded to a metal by firing said bonding composition on the vitrified ceramic surface and soldering such fired surface to a metal object with or without intermediate electroplating.

This application is a continuation-in-part of my copending applications Serial Nos. 543,161 and 543,162, filed July 1, 1944, now abandoned.

Bonding compositions comprising dispersions of finely divided glass flux and silver in a liquid vehicle have been compounded and used heretofore in a similar manner to bond a vitrified ceramic structure to a metal object.

Bonding compositions of this type as were known heretofore were of limited utility since they were incapable of producing a bond of satisfactory strength between the metal and the vitrified ceramic. Metal to vitrified ceramic bonds such as produced with the previously known bonding compositions were particularly defective in that the strength of the joint was inadequate regardless of how the previously known bonding compositions were used. Obviously, such weakness in a metal to vitrified ceramic bond practically prevents the employment of this useful means of bonding these two materials to each other in many applications where it would otherwise be of great value.

The term "vitrified ceramic" as used throughout the specification and claims is meant to include glass of the various different types and kinds, for example, lime-soda glass, borosilicate glass, metal borosilicate glass, colored glasses, optical glasses and the like, as well as vitrified porcelains of the various different types and kinds, for example, china porcelain, steatite porcelain, and the like.

It is an object of this invention to produce a new and improved silver-glass flux bonding composition.

It is another object of this invention to produce a silver-glass flux bonding composition by means of which it is possible to produce an improved bond strength between vitrified ceramic structures and metal objects.

It is still another object of this invention to produce a silver-glass flux bonding composition by means of which it is possible to produce an improved bond strength between porcelain and metal objects.

It is a further object of this invention to produce a silver-glass flux bonding composition by means of which it is possible to produce an improved bond strength between glass and metal objects.

It is a still further object of this invention to produce improved articles comprising metal bonded to vitrified ceramic structures by means of the above-mentioned improved bonding composition.

Other objects of the invention will appear hereinafter.

The objects of the invention may be accomplished, in general, by mixing, together with a liquid vehicle, finely divided particles taken from the group consisting of silver, silver oxide, and silver carbonate with finely divided particles of a bonding flux described particularly below, in proportions, by weight, of metallic silver: flux between 6:1 and 18:1. This new bonding composition can then be applied to a vitrified ceramic object, fired at a temperature at which the bonding composition fuses to the vitreous ceramic object, producing a metal surface which, after copper plating, or after burnishing, will accept a solder, and soldering a metal member to said metal surface.

In order to produce a secure bond between a porcelain and a metal object, the proportion of silver particles to the glass flux particles in the bonding composition should be between 12:1 and 18:1, and preferably between 13:1 and 17:1, said proportions based on the weight of the flux and the weight of metallic silver contained in the silver particles. The quantity of liquid vehicle in the bonding composition is immaterial to the operativeness of the invention. Depending upon whether a paste or liquid composition is desired, the quantity of liquid vehicle in the composition may be varied at will.

In order to produce a secure bond between a glass and a metal object the proportion of silver particles to the glass flux particles in the bonding composition should be between 6:1 and 11:1, and preferably between 7:1 and 10:1, said proportions based on the weight of the flux and the weight of metallic silver contained in the silver particles. Here again, the quantity of liquid vehicle in the bonding composition is immaterial to the operativeness of the invention. Depending upon whether a paste or liquid composition is desired, the quantity of liquid vehicle in the composition may be varied at will.

The silver particles in the above-described bonding compositions should be sufficiently finely divided to pass through a 100-mesh screen (100 meshes per linear inch). They may, however, be considerably finer than 100-mesh size. The silver particles may be in the form of metallic silver, or in the form of silver carbonate or silver oxide, or in any other form which in firing at the temperatures employed will be converted to metallic silver as is the case with silver carbonate and silver oxide.

The glass flux of the present invention must contain the following four oxides: Lead oxide (PbO), silica ($SiO_2$), boric oxide ($B_2O_3$) and titanium dioxide ($TiO_2$), although it may contain small amounts, preferably less than 10% in the aggregate, of other substances such as cadmium oxide (CdO), barium oxide (BaO), magnesium oxide (MgO), and an alkali metal fluoride (MeF). Not only must the glass flux contain PbO, $SiO_2$, $B_2O_3$, and $TiO_2$, but these oxides must be present within the following percentages by weight:

|  | Per cent |
|---|---|
| PbO | 40 to 75 |
| $B_2O_3$ | 1 to 10 |
| $SiO_2$ | 12 to 35 |
| $TiO_2$ | 1 to 8 |

As examples of specific compositions of suitable fluxes, the following may be given:

*Flux A*

|  | Per cent |
|---|---|
| PbO | 72.0 |
| $B_2O_3$ | 2.5 |
| $SiO_2$ | 24.0 |
| $TiO_2$ | 1.5 |
|  | 100.0 |

*Flux B*

|  | Per cent |
|---|---|
| PbO | 65.0 |
| $B_2O_3$ | 9.0 |
| $SiO_2$ | 16.0 |
| $TiO_2$ | 7.0 |
| CdO | 3.0 |
|  | 100.0 |

*Flux C*

|  | Per cent |
|---|---|
| PbO | 48.0 |
| $B_2O_3$ | 7.0 |
| $SiO_2$ | 33.0 |
| $TiO_2$ | 3.0 |
| CdO | 3.0 |
| NaF | 6.0 |
|  | 100.0 |

The fluxes are prepared in a known manner from materials which when molten will produce the particular flux composition. They may, for example, be prepared from red lead, boric acid, flint and titanium dioxide. The final flux particles should be sufficiently fine to pass through a 300-mesh screen.

As a liquid vehicle, a wide variety of materials may be employed. The liquid vehicle functions to hold the silver particles and flux particles together and in good admixture, and simplifies application of the composition to a vitrified ceramic object on which it is to be fired. Almost any liquid can be used which will not chemically react with the flux particles to a substantial extent, and which will not prevent the production of metallic silver during the firing operation. Substances such as turpentine, varnish, turpentine-varnish combinations; pine oil with or without rosin; drying oils, for example, linseed oil; volatile organic vehicles, for example, alcohols, particularly alcohols having between one and eight carbon atoms; ketones, for example, acetene; esters, for example, amyl acetate; ethers, for example, methyl ether or ethylene glycol. Water or water-alcohol mixtures can be used; however, water alone is preferably not used when the object coated with the bonding composition is subject to more or less handling prior to the firing thereof. Under some circumstances, it may be desirable to add a binder to the liquid vehicle. Substances such as polyvinyl alcohol, polyvinyl acetate, nitrocellulose, cellulose acetate and other cellulose derivatives may, for example, be used for this purpose. When using a binder, it is greatly to be preferred that it be soluble in the liquid vehicle used in the composition.

The bonding composition may be applied to the vitrified ceramic object to be coated in any desired manner. For example, it may be applied by spraying, brushing, dipping or by pressing the same through a screen stencil by means of a squeegee. The method of application, and the thickness of coating desired, will determine to a large extent the proportion of liquid vehicle in the composition. The coating should, of course, be thoroughly dried before it is fired. Where the liquid vehicle used is readily volatilized at room temperature (70° F.), the coating may be air-dried. Under some circumstances, it may be desirable to force-dry the coating by means of dry air currents or even by mild baking at temperatures not to exceed about 150° C.

The vitrified ceramic object containing the dry coating of bonding composition is fired in a muffle furnace, or the like, in a conventional manner. The firing must, of course, be carried out at a temperature at which the flux of the bonding composition will fuse to the vitrified ceramic object.

When the vitrified ceramic object is composed of porcelain, the firing temperature will preferably be between 625° C. and 800° C. The particular temperature employed will, of course, depend upon the composition of the particular porcelain being employed in the process. The firing period should take place over a period of several hours. Generally, a period of between four and eight hours will be sufficient to produce a good firm bond between the bonding composition and the porcelain object. The surface of the porcelain object containing the fired bonding composition will be composed of silver particles firmly held in a matrix of the flux in substantially the relative proportions present in the bonding composition before firing.

When the vitrified ceramic object is composed of glass, the firing temperature will preferably be between 5° C. and 25° C. below the temperature at which the glass object will be deformed. The particular temperature employed will, of course, depend upon the deformation temperature of the particular glass being employed in the process. When the bonding composition is fired on a soft glass, a temperature of the order of 1000° F. (approx. 540° C.) will be used in the firing operation.

When the bonding composition is applied to a heat-resisting glass, a temperature of the order of 1100° F. to 1150° F. (approx. 595° C. to 625° C.) will be used in carrying out the firing operation. The firing period should take place over a period of several hours. Generally, a period of between one and one-half and four hours will be sufficient to produce a good firm bond between the bonding composition and the glass object. The surface of the glass object containing the fired bonding composition will be composed of silver particles firmly held in a matrix of the flux in substantially the relative proportions present in the bonding composition before firing.

After the firing operation, the surface of the vitrified ceramic object which contains the fired bonding composition is treated to produce a metal surface which will accept a solder, i. e., a metal surface which is readily wet by solder. Preferably, this is accomplished by electro-deposition of a metal, for example, copper, on the fired bonding composition. This may be readily accomplished by positioning that portion of the ceramic object containing the fired, metallized bonding composition in a conventional electroplating bath composed of an aqueous solution of sulfuric acid and copper sulfate, and making the silver particle-containing bonding composition the cathode in the plating bath. The copper plating may have any desired thickness, for example, 0.0001 to 0.002 inch. The resulting copper-plated surface of the ceramic object will be readily wet by solder, and metal objects can be quickly and firmly soldered thereto. In order that the copper-plated area of the glass object may be more readily soldered, it is sometimes desirable to overcoat the copper with a thin coating of tin in a manner well understood in the art.

Although the above-mentioned process of electro-deposition is the preferred method for producing a bright metal surface on the fired, metallized bonding composition, a bright surface which will satisfactorily accept solder may be produced by burnishing the metallized surface. By burnishing this surface to the point where it exhibits a bright surface, it will readily accept solder and permit soldering of metal objects thereto.

The soldering of metal objects to the metallized coatings above-described is preferably accomplished with the commonly-known soft solder containing approximately equal parts of lead and tinu. Such solders may, however, contain small amounts of other metals, for example, silver, as used in known soldering compositions.

The metal to porcelain bond produced in accordance with the present invention has a high tensile strength, which, in some cases, is limited only by the strength of the porcelain to which the metal is bonded. By bonding porcelain to metal, in accordance with this invention, measured bond strengths as high as 2500 pounds per square inch have been obtained.

The metal to glass bond produced in accordance with the present invention has a high tensile strength, which, in some cases, is limited only by the strength of the glass to which the metal is bonded. By bonding glass to metal in accordance with this invention, measured bond strengths as high as 900 pounds per square inch have been obtained.

The accompanying illustrations show several examples of metals bonded to porcelain and glass in accordance with the principles of the present invention. In the accompanying illustrations:

Figure 1:
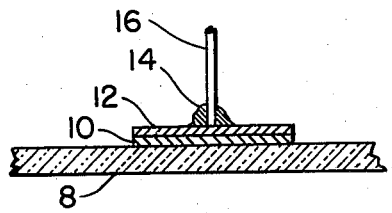
Figure 1 is a sectional view showing an electrical lead wire fastened to a glass or porcelain object.

Referring to Figure 1 of the drawings, reference numeral 8 designates a glass or porcelain object to which a bonding composition 10 is fastened in accordance with the invention above described. Reference numeral 12 designates electro-deposited copper on the bonding composition 10, and 14 designates solder surrounding the lead wire 16 and adhered to the electro-deposited copper 12.

Figure 2:
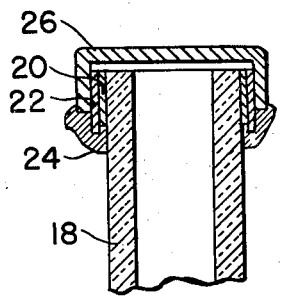
Figure 2 is a cross-sectional view of a glass or porcelain tube bonded to a metal cap.

In Figure 2, reference numeral 18 designates a tubular glass or porcelain object to which a bonding composition is fired in the manner above described. Numeral 22 designates a coating of electro-deposited copper on the fired bonding composition 20, and 24 designates a solder connecting metal cap 26 to the electro-deposited layer of copper 22.

Figure 3:
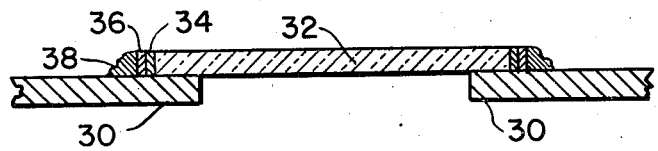
Figure 3 is a cross-sectional view showing a glass or porcelain bridge bonded to two metal members.

In Figure 3 of the drawings, two metal members 30 are bridged by means of a glass or porcelain member 32. The member 32 is bonded to the metal members 30 by first firing a bonding composition 34 on both end surfaces of the member 32, electro-depositing a layer of copper 36 onto the bonding composition, and applying solder 38 between the electro-deposited layer of copper 36 and the metal members 30.

Throughout the specification and claims, percentages, parts, and proportions refer to percentages, parts, and proportions by weight unless otherwise specified.

Since it is obvious that many changes and modifications can be made in the above-described details without departing from the nature and spirit of the invention, it is to be understood that the invention is not to be limited to said details except as set forth in the appended claims.

What is claimed is:

1. A silver-glass flux bonding composition comprising finely divided silver particles taken from the group consisting of silver, silver oxide, and silver carbonate and glass flux particles mixed with a non-reactive liquid vehicle in a proportion, by weight, of the metallic silver content of said silver particles to glass flux between 6:1 and 18:1, said glass flux containing between 40% and 75% PbO, between 1% and 10% $B_2O_3$, between 12% and 35% $SiO_2$, and between 1% and 8% $TiO_2$.

2. A silver-glass flux bonding composition comprising finely divided silver particles taken from the group consisting of silver, silver oxide, and silver carbonate and glass flux particles mixed with a non-reactive liquid vehicle in a proportion, by weight, of the metallic silver content of said silver particles to glass flux between 12:1 and 18:1, said glass flux containing between 40% and 75% PbO, between 1% and 10% $B_2O_3$, between 12% and 35% $SiO_2$, and between 1% and 8% $TiO_2$.

3. A silver-glass flux bonding composition comprising finely divided silver particles taken from the group consisting of silver, silver oxide, and silver carbonate and glass flux particles mixed with a non-reactive liquid vehicle in a proportion, by weight, of the metallic silver content of said silver particles to glass flux between 13:1 and 17:1, said glass flux containing between 40% and 75% PbO, between 1% and 10% $B_2O_3$, between 12% and 35% $SiO_2$, and between 1% and 8% $TiO_2$.

4. A silver-glass flux bonding composition comprising finely divided silver particles taken from the group consisting of silver, silver oxide, and silver carbonate and glass flux particles mixed with a non-reactive liquid vehicle in a proportion, by weight, of the metallic silver content of said silver particles to glass flux between 6:1 and 11:1, said glass flux containing between 40% and 75% PbO, between 1% and 10% $B_2O_3$, between 12% and 35% $SiO_2$, and between 1% and 8% $TiO_2$.

5. A silver-glass flux bonding composition comprising finely divided silver particles taken from the group consisting of silver, silver oxide, and silver carbonate and glass flux particles mixed with a non-reactive liquid vehicle in a proportion, by weight, of the metallic silver content of said silver particles to glass flux between 7:1 and 10:1, said glass flux containing between 40% and 75% PbO, between 1% and 10% $B_2O_3$, between 12% and 35% $SiO_2$, and between 1% and 8% $TiO_2$.

DANIEL O. KOCH.

REFERENCES CITED

The following references are of record in the file of this patent:

UNITED STATES PATENTS

| Number | Name | Date |
| --- | --- | --- |
| 617,299 | Purinton | Jan. 3, 1899 |
| 2,020,559 | Malinovszky | Nov. 12, 1935 |
| 2,389,386 | Russell | Nov. 20, 1942 |